United States Patent [19]

Mauer

[11] 4,261,245
[45] Apr. 14, 1981

[54] FASTENER

[75] Inventor: Dieter Mauer, Lollar, Fed. Rep. of Germany

[73] Assignee: USM Corporation, Farmington, Conn.

[21] Appl. No.: 57,252

[22] Filed: Jul. 13, 1979

Related U.S. Application Data

[62] Division of Ser. No. 855,606, Nov. 29, 1977, Pat. No. 4,189,978.

[30] Foreign Application Priority Data

Dec. 10, 1976 [DE] Fed. Rep. of Germany ....... 2656130
Dec. 10, 1976 [DE] Fed. Rep. of Germany ... 7638788[U]

[51] Int. Cl.³ ........................ F16B 13/04; F16B 33/04
[52] U.S. Cl. ..................................... 411/43; 29/469.5; 29/509; 29/512; 29/526 R; 219/98; 219/99
[58] Field of Search ...................... 29/512, 469.5, 523, 29/509, 526 R; 85/72, 77, 78, 9 W, 70; 219/98, 99

[56] References Cited

U.S. PATENT DOCUMENTS

| 3,300,798 | 1/1967  | York ................................... 85/77 X |
| 3,438,301 | 4/1969  | Mattioli ............................. 85/77 X |
| 3,504,424 | 4/1970  | Brown ............................... 29/512 X |
| 3,534,419 | 10/1970 | Deans et al. ........................ 85/72 X |
| 3,613,431 | 10/1971 | Meyer ................................ 29/512 X |
| 3,913,421 | 10/1975 | Hawkins ............................. 29/512 X |
| 3,934,325 | 1/1976  | Jaffe .................................. 29/523 X |
| 4,085,307 | 4/1978  | Jenkins ................................. 219/98 |

FOREIGN PATENT DOCUMENTS

| 459973  | 1/1937  | United Kingdom . |
| 625331  | 6/1949  | United Kingdom ........................ 85/77 |
| 1075969 | 7/1967  | United Kingdom ..................... 219/99 |
| 1229684 | 4/1971  | United Kingdom . |
| 1252653 | 11/1971 | United Kingdom . |
| 1286274 | 8/1972  | United Kingdom . |

Primary Examiner—Charlie T. Moon
Attorney, Agent, or Firm—Aubrey C. Brine

[57] ABSTRACT

A fastener is provided for securing an article to a support without making a hole in the support and wherein access can be gained to only one side of the support. The fastener is welded to the accessible surface of the support and the article is clamped to the support by setting the fastener with a blind-riveting tool.

3 Claims, 18 Drawing Figures

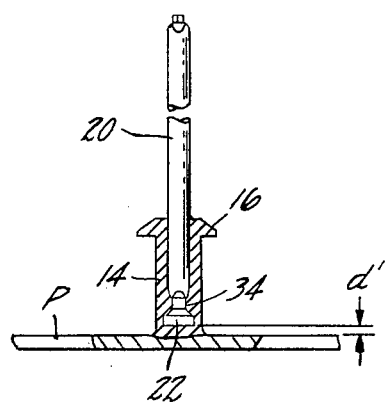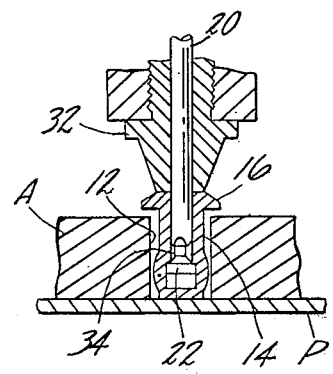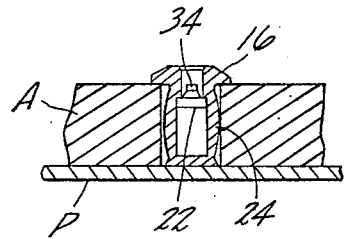

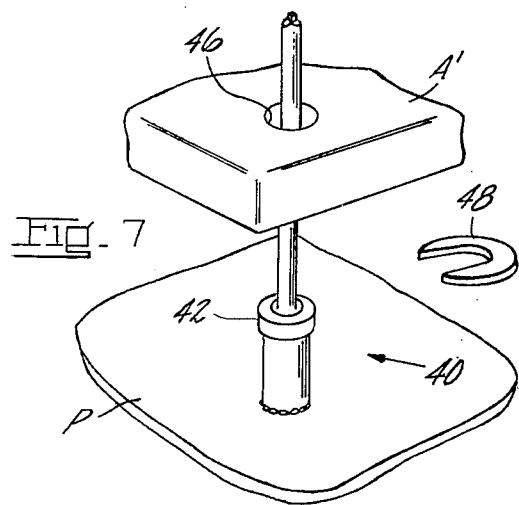
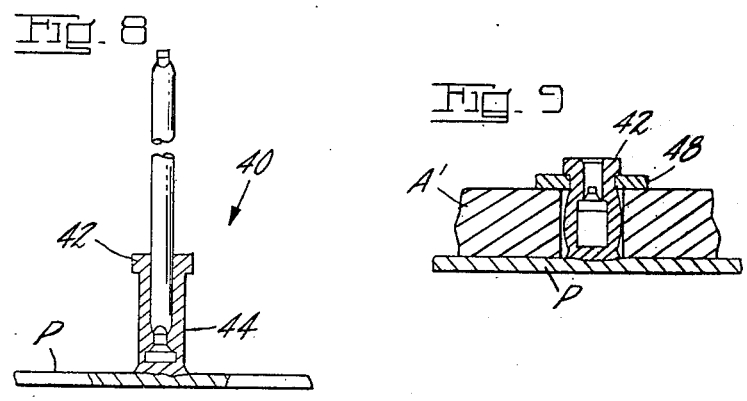

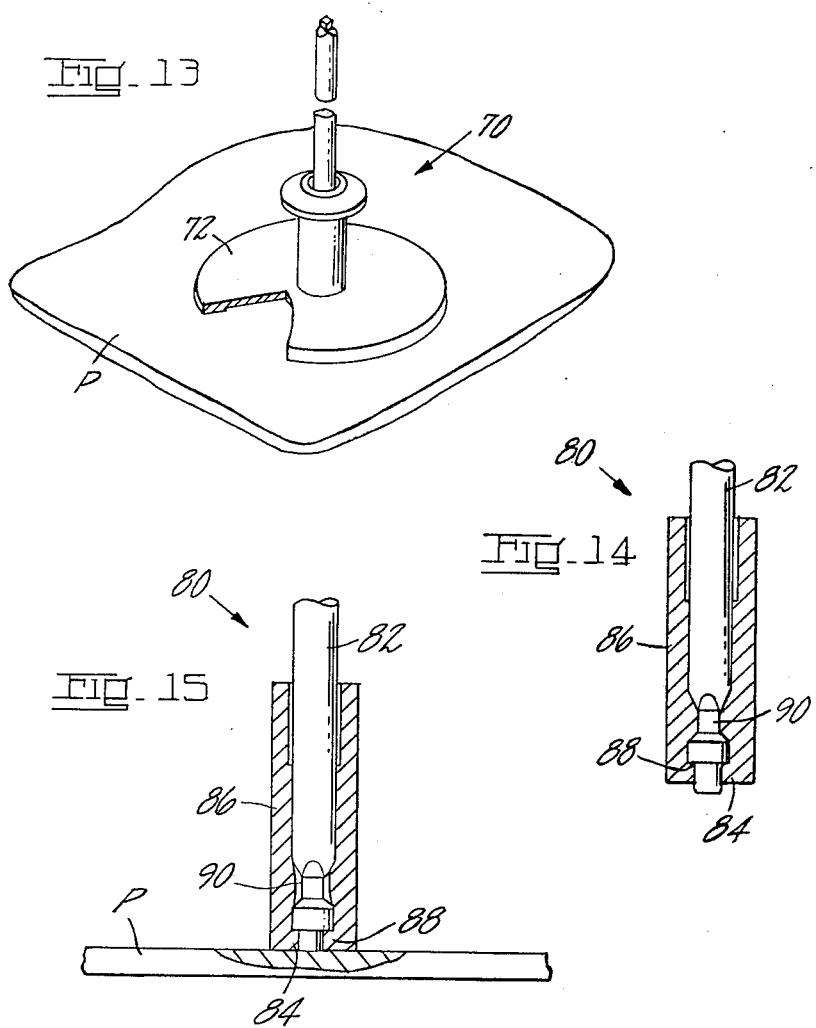

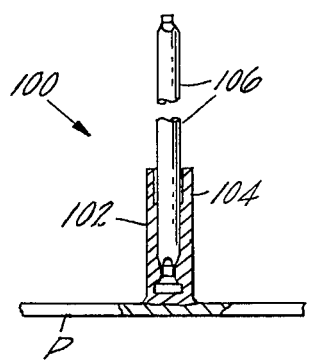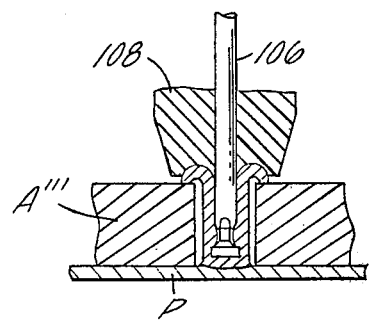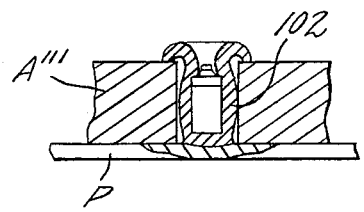

FASTENER

This is a division of application Ser. No. 855,606, filed Nov. 29, 1977, now U.S. Pat. No. 4,189,978, issued Feb. 26, 1980.

BACKGROUND OF THE INVENTION

This invention is concerned with improvements in or relating to fastening.

There are many occasions when it is desired to secure an article to a support without making a hole in the support for a bolt or a rivet; there are also occasions when access can be gained to one side only of the support. A well-known method of fastening articles to metal plates, for example, accessible from one side only where it is desired that a hole shall not be made in the plate for this purpose is to weld a screw-threaded stud to the plate, place the article, with a hole in it to receive the stud, over the stud, followed by a washer and then thread a nut on the stud and tighten it to clamp the article to the plate. This well-known method has the disadvantage of being usually rather slow, especially where acess is restricted, because the operator has to manipulate the nut into threaded engagement with the screw and then rotate it, by means of a suitable tool, to tighten it. The stud, washer and nut may also be undesirably costly.

It is accordingly an object of this invention to provide an improved, inexpensive and readily and rapidly effected method of securing an article to a support, without making a hole in the support and where the operator has access to one side only of the support, by means of a fastener which can be welded or bonded to the support and, while accommodated in an aperture in the article through which it projects, caused to effect clamping of the article to the support.

SUMMARY OF THE INVENTION

The foregoing object is achieved, in accordance with the invention, by such a method wherein the fastener comprises a tubular shank and a centrally disposed pin, part of which is accommodated in the shank and part of which projects from the shank at the opposite end of the fastener from that which is to be welded or bonded to the support, the pin being anchored to the shank at a locality remote from the end from which the pin projects so that pulling of the pin against reaction of an anvil bearing on the shank at that end effects deformation of the shank to set the fastener, and wherein the fastener is welded or bonded to the support, the shank of the fastener is accommodated in an aperture in the article, and the fastener is set by means of a tool which pulls the pin while pushing on the end of the shank from which the pin projects to set the fastener and cause the article to be clamped to the support.

Preferably, in carrying out a method in accordance with the invention, the shank of the fastener has a preformed, radially outwardly projecting head at that end from which the pin projects, and the aperture in the article is large enough to leave clearance around the shank so that, as a consequence of radial expansion of the shank within the aperture the shank will be shortened and the head drawn towards the support to clamp the article. Such expansion may be effected by providing the pin with an enlarged head accommodated in a recess in the shank in the manner of a sealed, or closed-ended, type of pull-type blind rivet, and intermediate portion of the shank closely surrounding the pin adjacent the head so that the head cannot be retracted relative to the shank without radial expansion of the shank. The head of the shank may be large enough to overlie the wall of the aperture in the article without the need for a washer, or may be small enough to pass through a circular aperture in the article, allowance therefore being afforded by the aforementioned clearance; in the latter case, a washer may be provided under themandrel head, for example a U-shaped one which can be slid into position after passing the article over the head of the shank. Alternatively the article may have a keyhole slot permitting it to be asembled on a shank with a large head after welding or bonding the fastener to the support. Another procedure for a fastener having a shank with a large head, where the materials and control of a welding operation, for example, permit, is to place the article in position on the support and then introduce the fastener through the aperture in the article and weld it to the support.

Where the fastener is, as already mentioned, of the kind resembling a closed-ended blind rivet and is to be welded to a support, sufficient metal must be provided at the closed end of the rivet beyond the mandrel stem. Because 0.5 to 0.7 mm thickness of the end of the shank will be melted, the closed end should be at least one millimeter thick. The choice of material of the shank will determine the method of manufacture of the fastener in accordance with known processes.

Where the shank of a fastener for use in the method of the invention is not initially provided with a preformed head, a head at that end from which the pin projects may be formed, by outward splaying of material of the shank, with or without splitting, during the setting of the fastener. In such a case, if separation of the shank into segments is desired, the shank may be provided with splits or lines of weakness to assist such separation. Also, where an anvil of the setting tool is to form a head on the shank by bearing against the end of the shank from which the pin projects with a force counterbalancing that of a pull applied to the pin, the pin may be anchored in the shank by welding it to the shank, for example, or it may itself project from the other end of the shank and itself welded to the support.

BRIEF DESCRIPTION OF THE DRAWINGS

Examples of fasteners in accordance with the invention, for use in carrying out the aforementioned method, are described hereinafter by way of example and not of limitation of the invention, with reference to the accompanying drawings in which:

FIGS. 2, 3 and 4 show successive steps in welding the fastener of FIG. 1 to the support in carrying out an illustrative example of a method in accordance with the invention;

FIG. 5 is a view in section of the fastener of FIG. 1 at an early stage of deformation on being set in securing an article to the support;

FIG. 6 is a view in section showing the article secured to the support by the fastener of FIG. 1;

FIG. 7 shows in perspective, and FIGS. 8 and 9 show in section, a second fastener in accordance with the invention welded to a support, and successive stages in assembling an article thereon and setting the fastener;

FIG. 13 is a view in perspective, and partly in section, of a fourth fastener in accordance with the invention, adhesively bonded to a support and ready to receive an article to be secured thereto;

FIGS. 14 and 15 show, in section, a fifth fastener in accordance with the invention; and FIGS. 16, 17 and 18 show successive stages in setting a sixth fastener in accordance with the invention.

DESCRIPTION OF A PREFERRED EMBODIMENT

Figure 1:
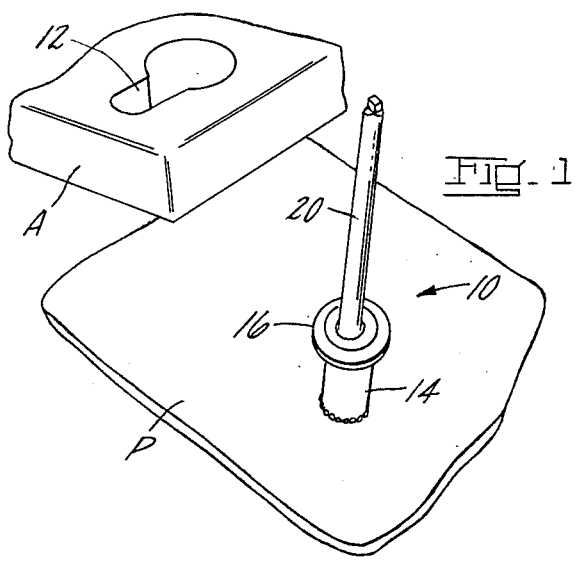
FIG. 1 is a view in perspective of a first illustrative embodiment of a fastener in accordance with the invention welded to a support with an article about to be assembled on it.
Figure 2:
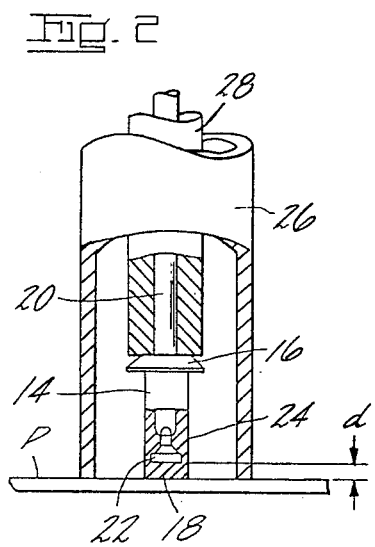
Figure 3:
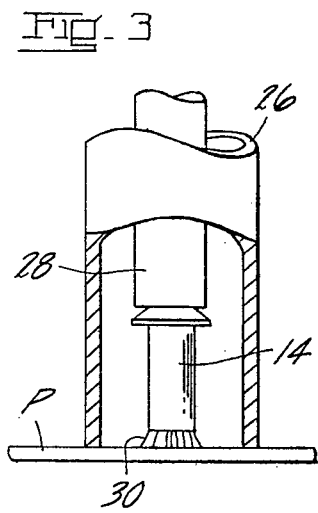

The first illustrative fastener 10 (FIGS. 1 through 6) is shown in perspective in FIG. 1 welded to a support in the form of a sheet metal panel P. An article A with a keyhole slot 12 in it is shown about to be assembled with the fastener. The fastener 10 has a tubular shank 14 (FIG. 2) of uniform external diameter and an outwardly flanged annular head 16 at one end. At its other end, the shank 14 is closed by an end wall 18 which is at least one millimeter thick, to allow for melting or "burn-off", when the shank is welded to the panel. Centrally disposed within the shank, and partly accomodated in the shank and projecting from the head 16 is a pin 20. The pin 20 has a head 22 anchored in a recess in the shank 14 and abutting the end wall 18, the wall of an intermediate portion 24 of the shank closely surrounding the pin 20 so that the head 22 cannot be withdrawn from the shank without deformation of the fastener.

In carrying out the illustrative method, the fastener 10 is welded to the panel P by means of a welding gun which has a grounding foot in the form of a sleeve 26 (FIG. 2) which engages the panel P and an electrode holder 28, which has a bore to receive the projecting portion of the pin 20 and is arranged to abut the head 16 of the shank 14. The holder 28 and sleeve 26 are electrically insulated from one another, but connected to opposite poles of a capacitor so that current therefrom can be discharged through the panel and fastener in a welding cycle. The welding unit is of the kind whereby an initial pilot arc 30 (FIG.3) can be drawn out upon withdrawal of the fastener from the panel P by the holder 28 while a small current is passing followed by plunging the fastener towards the panel while the capacitor fully discharges through the arc which has been established. The resulting fusion of the metal at the tip of the fastener and adjacent portion of the panel results in welding of the fastener to the panel. As indicated by the distances d and d' on FIGS. 2 and 4, respectively, the end wall 18 of the shank 14 has been reduced in thickness by 0.5 to 0.7 millimeters.

Next, in carrying out the method illustrated in FIGS. 1 through 6, the article A is assembled on the panel P by passing the large end of the keyhole slot 12 over the head 16 of the shank 14 of the fastener 10, and sliding the narrow end of the slot under the head. It will be observed from FIG. 5 that there is significant clearance between the shank 14 and the wall of the slot 12 after such assembly. The fastener 10 is then set by means of a conventional pull-type blind-riveting tool comprising a nosepiece 32 (FIG. 5) which has a bore to receive the pin 20 and which itself abuts the head 16, and jaws (not shown) which grip the pin 20 and pull it upwardly (viewing FIG. 5) while the reaction to the pull is counterbalanced by the thrust of the nosepiece 32 bearing on the head 16. The result is radial expansion of the intermediate portion 24 of the shank 14 as the pin head 22 moves up the shank and consequent shortening of the shank to cause the head 16 to clamp the article A firmly against the panel P. On completion of the setting of the fastener, as the head 22 of the pin approaches the head 16 of the shank, the pin 10 breaks at a neck 34 which it is provided near its head 22.

The shank 14 of the fastener 10 may be made of any suitable material for welding, brass, copper or stainless steel being preferred where it is to be welded to a steel panel. The pin 20 is preferably steel. The fastener may be made by the known methods of manufacture of close-ended pull-type blind rivets, the manufacturing procedure depending on the metal selected.

FIGS. 7, 8 and 9 depict an alternative fastener 40, similar to that of FIG. 1 except that a head 42 of the shank 44 is no larger than a circular hole 46 in the article, A', which is to be secured to the panel. In setting a fastener such as those of FIGS. 1 and 9, it is desirable that the intermediate portion of the shank can expand freely within the aperture in the article unrestrained by the wall of the aperture. In the case of a copper shank, for example, with a steel pin, similar to a conventional closed-ended pull-type blind rivet except that it is suitable for welding to a panel (conventional rivets do not normally have sufficient thickness of metal at their closed ends for this purpose), a shank with an external diameter of 4.78 mm may expand to 6.35 mm on retraction of the pin, with a consequent shortening of the shank from 11.3 mm to 8 mm. The hole 46, or the narrow end of the slot 12 of the article A, should be large enough to accommodate this expansion.

The head 42 of the fastener of FIGS. 7, 8 and 9 provides a radial shoulder under which, after passing the article over the fastener when it has been welded to the panel P, a U-shaped washer 48 is slid. The washer and article thus become firmly clamped to the panel on setting of the fastener.

Figure 10:
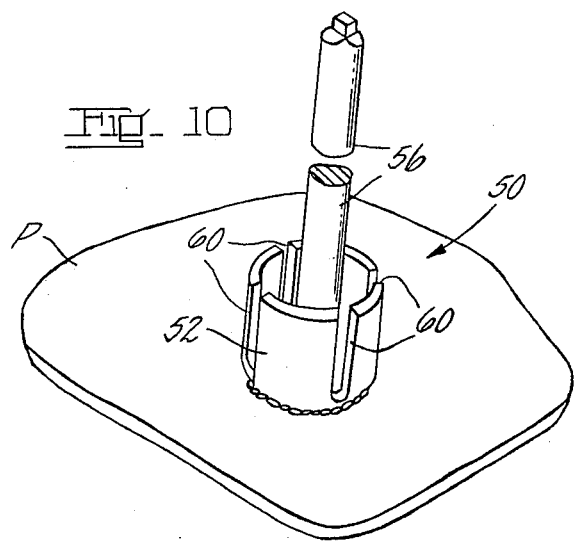
FIGS. 10, 11 and 12 represent successive stages in setting a third fastener in accordance with the invention.
Figure 11:
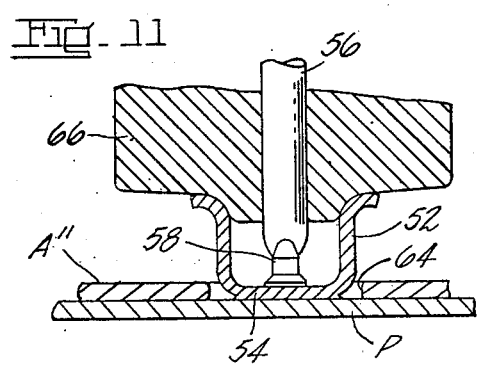
Figure 12:
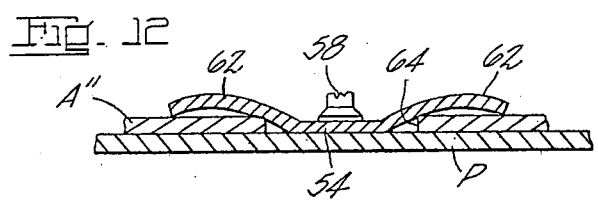

FIGS. 10, 11 and 12 show another fastener, 50, in accordance with the invention, comprising a cup-shaped shank 52 to a bottom wall 54 of which one end of a pin 56 is welded so that the pin extends centrally through the shank and projects at its open end. The pin has a neck 58 at which it breaks after setting the fastener, and the shank has slits 60 (as shown in FIG. 10) or incipient lines of weakness where it will split into four segments 62 on engagement by the nosepiece 66 of the setting tool, which has jaws to grip the pin 56 and a nosepiece to abut the shank 52 as mentioned hereinbefore. Thus, the fastener 50 may be welded to a panel P and the segments 62 splayed to secure and article A", (for example another panel as depicted in FIGS. 11 and 12), with a round hole 64 in it to the panel P.

FIG. 13 shows a fastener 70 of the same configuration and manner of setting as the fastener 10 of FIG. 1 except that, instead of the fastener being welded to the support P, it has a disc-shaped flange 72, slightly recessed to accommodate a layer of adhesive, whereby it is bonded to the support.

FIG. 14 shows another form of fastener 80 in accordance with the invention, of a kind which can be set by rolling out a head flange over an article by means of a blind-riveting tool after welding the fastener to the support, shown as the panel P. In this case, instead of the pin having a head anchored in a recess in the shank (as in FIG. 2) or welded to a closed end of the shank (as in FIG. 11), the pin 82 itself projects through a hole in the otherwise closed end 84 of the shank 86 and is itself welded to the panel P, as shown in FIG. 15. Thus, a reduced end portion of the pin extends through the hole in the end wall 84 of the shank, the wall 84 itself being engaged by an annular shoulder 88 on the pin 82 to anchor the pin to the shank. The portion of the pin 82 projects far enough from the shank 86 to provide metal for the welding operation. The pin 82 has a neck 90 at which it will break after setting of the fastener.

An end portion 92 of the shank 86 remote from the welding end of the fastener 80 is splayed out on setting, preferably to form a continuous annular flange, but the flange may be split into prongs if perferred, and for this purpose has an internal diameter slightly larger than the pin 82 to facilitate the action of the nosepiece of the setting tool, the nosepiece being shaped as hereinafter mentioned with reference to FIG. 17. The article to be assembled with the fastener may have a round hole in it only just big enough to accommodate the shank.

FIGS. 16, 17 and 18 show a fastener 100 similar to that of FIGS. 1 through 6 except that the shank 102 has no preformed head, but has an end portion 104 of slightly larger internal diameter than the pin 106 from which a pin projects similar to that of FIGS. 14 and 15, adapted to be flanged outwardly on setting. Thus, after the shank 102 has been welded to the panel, an article A''' with a round hole in it to afford clearance around the shank 102 may be assembled on the fastener 100, and the fastener set by a blind-riveting tool having a nosepeice 108 with a concave annular surface to engage the portion 104 of the shank with the result that first a head is rolled out from the portion 104 to engage the article around the hole and then an intermediate portion of the shank is expanded by retraction of the pin 106 to foreshorten the shank and clamp the article firmly to the panel.

It will be appreciated that in carrying out the invention with any of the fasteners described, the fastener is set in such a manner that the pull on the centrally disposed pin is counterbalanced by the thrust of the nosepiece, or anvil, of the setting tool on the shank and accordingly no significant force is applied to the support to which the article is being secured.

Each of the illustrative fasteners described can be manufactured economically by mass production procedures. In carrying out the foregoing method using these fasteners, assembly of articles can be effected rapidly and with little manipulative dexterity on the part of the operator.

I claim:

1. A fastener for use in securing an article to a support without making a hole in the support comprising a tubular shank of substantially constant outside diameter open at one end, and an end wall at the other, said end wall being weldable to the support or adapted to be bonded thereto, and a pin centrally disposed with respect to said shank, partly accommodated therein and in part projecting therefrom at one end remote from said end wall and extending through an opening formed in said end wall, said pin having a head accommodated in a recess in said shank adjacent said end wall and being closely surrounded by an intermediate portion of said shank such that said head cannot be retracted relative to said shank without radial expansion of said shank and a weldable tip extending through said end wall opening, and a portion of said shank at said open end having a slightly larger internal diameter than said intermediate portion whereby said open end of said shank is disposed in spaced relation with said projecting part of said pin being adapted to be splayed radially outwardly by an anvil bearing thereagainst with a force counter balancing that of a pull applied to said pin.

2. A fastener according to claim 1 further characterized in that said end wall is at least one millimeter thick.

3. A fastener for use in securing an article to a support without making a hole in the support comprising a tubular shank of substantially constant outside diameter open at one end and having an end wall at the other end, said end wall being weldable to the support or adapted to be bonded thereto and having an opening formed therein, and a centrally disposed pin having a weldable tip extending through said opening, part of said pin being accommodated in said shank and part projecting from said open end of said shank, said pin being anchored to said shank at a locality remote from said open end, said shank at said open end having an internal diameter slightly larger than said pin and being adapted to be splayed radially outwardly by an anvil bearing thereagainst with a force counterbalancing that of a pull applied to said pin.

* * * * *